(12) United States Patent
Abraham et al.

(10) Patent No.: US 12,489,757 B2
(45) Date of Patent: Dec. 2, 2025

(54) SYSTEM AND METHOD FOR SCALABLE MULTI-APPLICATION USER ACCESS AND SEGREGATION OF DUTIES REVIEW

(71) Applicant: Onapsis Inc., Boston, MA (US)

(72) Inventors: Sergio Abraham, Ciudad Autonoma de Buenos Aires (AR); Sebastian Rodriguez, Boston, MA (US); Frederik Weidemann, Boston, MA (US)

(73) Assignee: Onapsis Inc., Boston, MA (US)

( * ) Notice: Subject to any disclaimer, the term of this patent is extended or adjusted under 35 U.S.C. 154(b) by 764 days.

(21) Appl. No.: 17/843,374

(22) Filed: Jun. 17, 2022

(65) Prior Publication Data

US 2022/0407864 A1    Dec. 22, 2022

Related U.S. Application Data

(60) Provisional application No. 63/211,759, filed on Jun. 17, 2021.

(51) Int. Cl.
  *H04L 9/40*    (2022.01)
  *G06Q 10/105*  (2023.01)
  *H04L 29/06*   (2006.01)

(52) U.S. Cl.
  CPC ......... *H04L 63/104* (2013.01); *G06Q 10/105* (2013.01); *H04L 63/20* (2013.01)

(58) Field of Classification Search
  CPC ....... H04L 63/104; H04L 63/20; H04L 63/10; H04L 63/102; H04L 63/105; H04L 63/205; G06Q 10/105
  See application file for complete search history.

(56) References Cited

U.S. PATENT DOCUMENTS

2017/0063910 A1*  3/2017  Muddu ................ G06F 3/0482
2021/0168150 A1*  6/2021  Ross .................... G06F 16/9024

* cited by examiner

*Primary Examiner* — Edward Zee
(74) *Attorney, Agent, or Firm* — Crowell & Moring LLP

(57) ABSTRACT

Security can be improved in a business application or system, such as a mission-critical application, by automatically analyzing user access (UA) and segregation of duties (SoD). This analysis may be using a graphical representation of a model with nodes for business application concepts and edges for relationships between nodes. A review of the graphical representation is used for UA and SoD.

7 Claims, 4 Drawing Sheets

SYSTEM AND METHOD FOR SCALABLE MULTI-APPLICATION USER ACCESS AND SEGREGATION OF DUTIES REVIEW

RELATED APPLICATIONS

This application claims priority to U.S. Provisional Pat. App. No. 63/211,759 filed Jun. 17, 2021, entitled "SYSTEM AND METHOD FOR SCALABLE MULTI-APPLICATION USER ACCESS AND SEGREGATION OF DUTIES REVIEW", the entire contents of which are hereby incorporated by reference.

TECHNICAL FIELD OF THE INVENTION

The present invention relates to security for mission-critical applications.

BACKGROUND

Businesses may rely on electronic systems using database technology to manage their key processes. There may be a number of applications that businesses rely on that include mission-critical applications (MCAs). One example business application that may be a MCA is an Enterprise Resource Planning (ERP) system. Other examples of MCAs include Customer Relationship Management (CRM), Supply Chain Management (SCM), Product Lifecycle Management (PLM), Human Capital Management (HCM), Integration Platforms, Business Warehouse (BW)/Business Intelligence (BI) and Integration applications developed by SAP, ORACLE, MICROSOFT, SALESFORCE, NETSUITE, WORKDAY, SIEBEL, JD EDWARDS, PEOPLESOFT, and others. These applications are in charge of processing sensitive business data and, accordingly, the confidentiality, integrity and availability of this information is therefore critical for the security and continuity of the business. Access rights for users may include permission or authorization in a particular MCA and can be a potential security risk. Improper or in secure access rights can endanger an application through loss of critical/protected data, loss of reputation, loss of business, lawsuits, etc. Therefore, it is important to effectively mitigate these risks.

BRIEF SUMMARY

The present invention relates to a method, system or apparatus and/or computer program product for improved security by automatically analyzing user access rights and segregation of duties for mission-critical applications. This analysis may be using a graphical representation of a model with nodes for business application concepts and edges for relationships between nodes.

BRIEF DESCRIPTION OF THE DRAWINGS

The figures illustrate principles of the invention according to specific embodiments. Thus, it is also possible to implement the invention in other embodiments, so that these figures are only to be construed as examples. Moreover, in the figures, like reference numerals designate corresponding modules or items throughout the different drawings.

DETAILED DESCRIPTION OF THE DRAWINGS AND PREFERRED EMBODIMENTS

Figure 1:
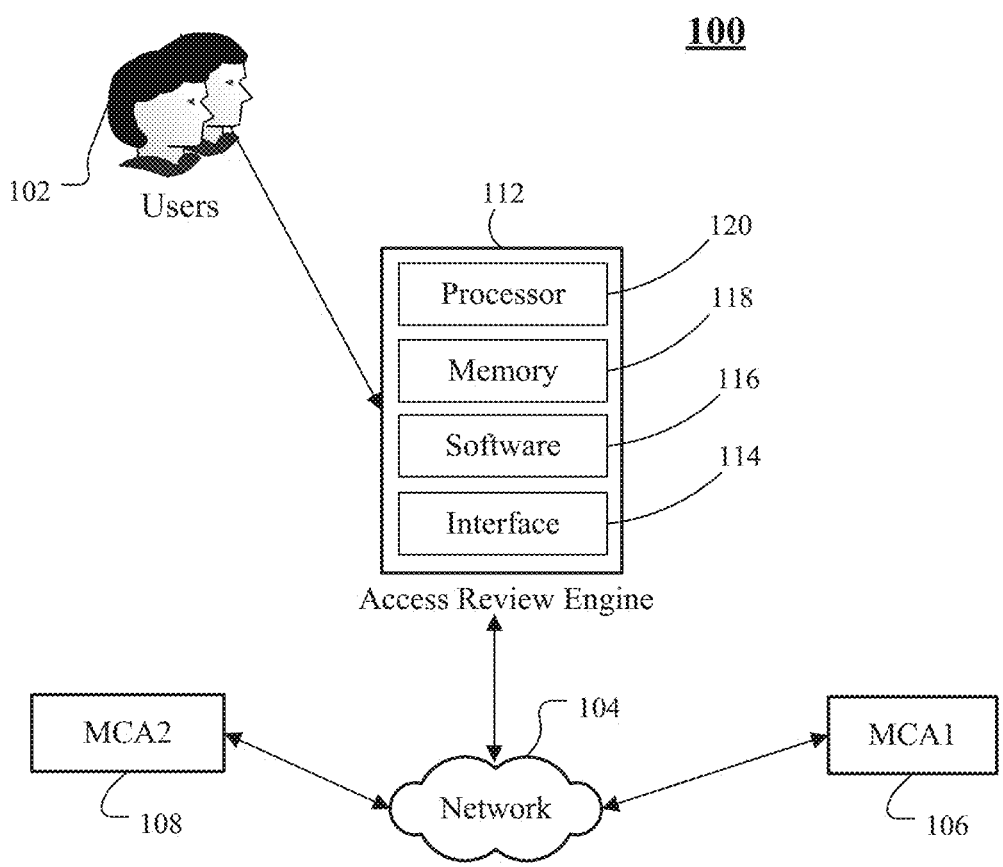
FIG. 1 illustrates a block diagram of an example network system.

By way of introduction, the disclosed embodiments relate to systems and methods for automatically executing User Access (UA) and Segregation of Duties (SoD) reviews over multiple mission-critical applications (MCAs). Examples of MCAs include, but are not limited to Enterprise Resource Planning (ERP), Customer Relationship Management (CRM), Supplier Relationship Management (SRM), Supply Chain Management (SCM), Product Life-cycle Management (PLM), Human Capital Management (HCM), Integration Platforms, Business Warehouse (BW)/Business Intelligence (BI) and Integration applications developed by SAP, ORACLE, MICROSOFT, SALESFORCE, NETSUITE, WORKDAY, SIEBEL, JD EDWARDS, PEOPLESOFT, and others. The embodiments described herein relate to the UA and SoD reviews between and among such business applications, including MCAs. The embodiments apply to MCAs and may be described with respect to specific examples, but are not limited to specific applications.

Mission-critical applications (MCAs) are subject to security scrutiny because of compliance regulations or because of the criticality of the stored information or the processes executed in the MCA. Depending on the type of application, the technical review may vary but may include User Access (UA) review and Segregation of Duties (SoD) review. For example, Sarbanes-Oxley Act of 2002 audits may require this type of assessment for the in-scope applications, i.e., the Enterprise Resource Planning system, the Human Capital Management system, the Customer Relationship Management system, the Business Warehouse/Intelligence system, etc.

An access right or a user access right assigns a user an ability to execute a specific task or job in an application (e.g.: read a file, create users, create a vendor). Depending on the application, it can also be referred to as permission or authorization.

A User Access (UA) review includes an analysis of access rights for users of a certain system, including not only employees but also contractors or any other entity that has access to the system. An analysis of the access rights may include an evaluation of the users, user types, roles and profiles assigned to the users, user groups, and any other application-specific concept that is used to provide any access within the system. For example, a UA review may include detecting the users in the system that have access to modify vendor master records. These users may be evaluated to determine if they have the right level of access.

A Segregation of Duties (SoD) review may include an analysis based on an internal controls principle that requires more than one person to complete a certain critical task. This type of analysis may include at least two groups of permissions that are in conflict. For example, group A represents the permissions required to create a vendor, and group B represents the permissions required to create a purchase order and pay to a vendor. In this example, an SoD review would include detecting the users in the system that have both groups of permissions assigned. These users represent a business risk that should be addressed by removing at least one of the groups of permissions from the user and assigning it to a second user or creating a compensating control, like continuously reviewing the users' activity in the system.

With companies increasing their footprint of deployed applications (both on-premise and in the cloud), the number of UA and SoD reviews have increased not only in the quantity but also in complexity. Further, new risk scenarios arise from SoD risks that combine permissions from multiple applications on one or many systems. An SoD review query consists of at least two UA review queries that are combined by an operator. For example, an SoD review may include two groups of permissions, and each group of permissions can be executed as two separate UA reviews. Further, the final SoD review result may represent an intersection of both UA results.

The review query solves the following questions: Who has access to X? This may refer to the actual access right or permission where "access to X" represents the authorizations that allow a user to execute a particular action in the system. The reviews further need to properly ask: How is X assigned to them? This refers to how the authorizations are assigned to the users. Depending on the type of application, authorizations can be assigned through roles, profiles, groups, or a combination of them. Without this information, security administrators would not be able to address or mitigate the identified risks. With increasingly complex systems, it may be difficult to answer who has access to X and how X is assigned to them. Complex systems may have complex authorization models. A root cause of this problem is also the volume of data that has to be handled, which can be dozens of tables with thousands of rows and how those tables relate to each other, sometimes making the Cartesian product of their content grow exponentially. Some solutions connect to the application and query the live tables in the system. Others query the tables after a download of tables is made. These solutions are based on relational database models that are a copy of the actual permissions model in the system, optimized using database indexes.

As described herein, the questions of who has access to X and how is X assigned to them, can be answered efficiently in terms of required storage and execution time. Further, this can be extended to cover multiple systems and applications. For example, the model can execute cross-application UA and SoD reviews. The model is a visual model of the permissions schema for a given application that helps developers of the system to create new ones and fix existing ones even without domain knowledge for that application. The visual model will be further described with respect to the following Figures. FIG. 1 provides an example network environment for operating the visual model.

FIG. 1 illustrates a block diagram of an example network system 100. The system 100 may include functionality for providing permissions or authorizations to users (e.g. users 102), including user access. The user access may be referred to as access rights that allows a user to execute a specific task in an application (e.g.: read a file). Depending on the application, user access or user rights may also be referred to as permission or authorization. Specifically, the access review engine 112 establishes user access rights for one or more MCAs, such as MCA1 106 and MCA2 108. The access review engine 112 may also be referred to as a permissions processor or an authorization processor. The MCAs 106, 108 are exemplary MCA systems in which the access review engine 112 establishes and updates user access rights.

Communications in system 100 may be over a network 104 that interconnects any of the components. For example, the user access rights from the access review engine 112 may be communicated over the network 104. The network 104 may be an internal network, an external network, a local connection, a direct connection/interface, or a combination. The connections may be through an Application Programming Interface ("API") and/or through a local agent (not shown). This connection may be made by mimicking a user or any other technique to extract the required information over the network 104.

The access review engine 112 may be a computing device. The access review engine 112 may be operated by users (e.g. users 102). In one embodiment, the access review engine 112 may be software that runs on a computing device as shown in FIG. 1. The access review engine 112 determines user access rights from the users 102 with MCA1 106 and MCA1 108. The access review engine 112 may include a processor 120, a memory 118, software 116 and a user interface 114. In alternative embodiments, the access review engine 112 may be multiple devices to provide different functions and it may or may not include all of the user interface 114, the software 116, the memory 118, and/or the processor 120.

The user interface 114 may be a user input device or a display. The user interface 114 may include a keyboard, keypad or a cursor control device, such as a mouse, or a joystick, touch screen display, remote control or any other device operative to allow a user or administrator to interact with the access review engine 112. The user interface 114 may communicate with any of the systems in the network 104, including the access review engine 112, and/or the MCAs 106, 108. The user interface 114 may include a user interface configured to allow a user and/or an administrator to interact with any of the components of the access review engine 112 for establishing user access rights. The user interface 114 may include a display coupled with the processor 120 and configured to display an output from the processor 120. The display (not shown) may be a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor 120, or as an interface with the software 116 for providing data.

The processor 120 in the access review engine 112 may include a central processing unit (CPU), a graphics processing unit (GPU), a digital signal processor (DSP) or other type of processing device. The processor 120 may be a component in any one of a variety of systems. For example, the processor 120 may be part of a standard personal computer or a workstation. The processor 120 may be one or more general processors, digital signal processors, application specific integrated circuits, field programmable gate arrays, servers, networks, digital circuits, analog circuits, combinations thereof, or other now known or later developed devices for analyzing and processing data. The processor 120 may operate in conjunction with a software program (i.e. software 116), such as code generated manually (i.e., programmed). The software 116 may include a determination of access rights as further described below, such as the example described with respect to FIG. 2.

The processor 120 may be coupled with the memory 118, or the memory 118 may be a separate component. The software 116 may be stored in the memory 118. The memory 118 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The memory 118 may include a random access memory for the processor 120. Alternatively, the memory 118 may be separate from the processor 120, such as a cache memory of a processor, the system memory, or other memory. The memory 118 may be an external storage device or database for storing recorded tracking data, or an analysis of the data. Examples include a hard drive, compact disc ("CD"), digital video disc ("DVD"), memory card, memory stick, floppy disc, universal serial bus ("USB") memory device, or any other device operative to store data. The memory 118 is operable to store instructions executable by the processor 120.

The functions, acts or tasks illustrated in the figures or described herein may be performed by the programmed processor executing the instructions stored in the software 116 or the memory 118. The functions, acts or tasks are independent of the particular type of instruction set, storage media, processor or processing strategy and may be performed by software, hardware, integrated circuits, firmware, micro-code and the like, operating alone or in combination. Likewise, processing strategies may include multiprocessing, multitasking, parallel processing and the like. The processor 120 is configured to execute the software 116.

The present disclosure contemplates a computer-readable medium that includes instructions or receives and executes instructions responsive to a propagated signal, so that a device connected to a network can communicate voice, video, audio, images or any other data over a network. In some embodiments, the connection (e.g. through the network) may be a local or direct connection between components that allows for local network traffic. The user interface 114 may be used to provide the instructions over the network via a communication port. The communication port may be created in software or may be a physical connection in hardware. The communication port may be configured to connect with a network, external media, display, or any other components in system 100, or combinations thereof. The connection with the network may be a physical connection, such as a wired Ethernet connection or may be established wirelessly as discussed below. Likewise, the connections with other components of the system 100 may be physical connections or may be established wirelessly.

Any of the components in the system 100 may be coupled with one another through a (computer) network, including but not limited to the network 104. For example, the access review engine 112 may be coupled with the source 106 and/or the destination 108 through the network 104 or may be coupled directly through a local connection. In some ERP systems, the network 104 may be a local area network ("LAN"), or may be a public network such as the Internet. Accordingly, any of the components in the system 100 may include communication ports configured to connect with a network. The network or networks that may connect any of the components in the system 100 to enable communication of data between the devices may include wired networks, wireless networks, or combinations thereof. The wireless network may be a cellular telephone network, a network operating according to a standardized protocol such as IEEE 802.11, 802.16, 802.20, published by the Institute of Electrical and Electronics Engineers, Inc., or WiMax network. Further, the network(s) may be a public network, such as the Internet, a private network, such as an intranet, or combinations thereof, and may utilize a variety of networking protocols now available or later developed including, but not limited to TCP/IP based networking protocols. The network(s) may include one or more of a local area network (LAN), a wide area network (WAN), a direct connection such as through a Universal Serial Bus (USB) port, and the like, and may include the set of interconnected networks that make up the Internet. The network(s) may include any communication method or employ any form of machine-readable media for communicating information from one device to another.

Figure 2:
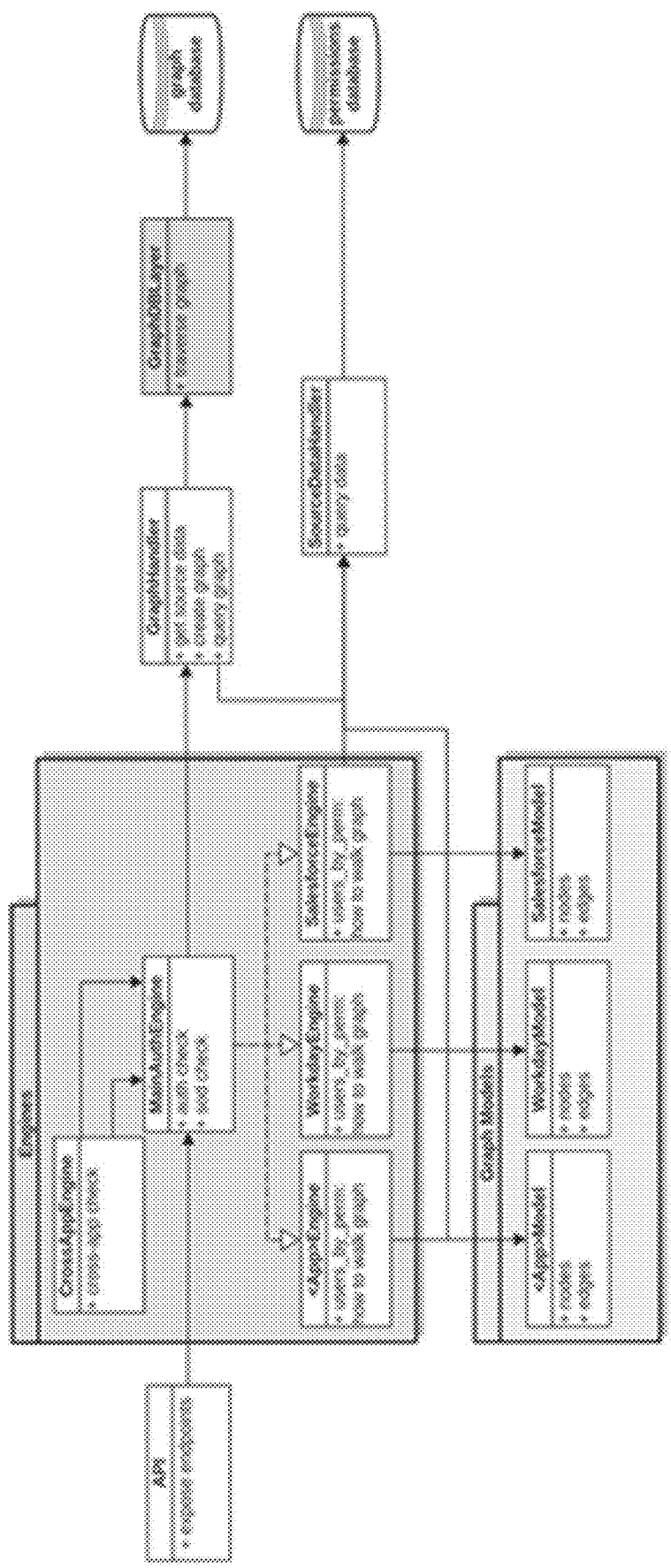
FIG. 2 illustrates a system for handling user access rights.

While FIG. 1 illustrates an example network system for the visual model, FIG. 2 provides an additional system for the visual model. Specifically, FIG. 2 illustrates a system for handling user access rights. In some embodiments, the system includes engines, models, graph models, data handlers, a graph handler, one or more graph databases, one or more permission databases, and one or more graph abstraction layers. In some embodiments, the engines, models, and handlers may be operated by the access review engine 112 from FIG. 1. In one embodiment, the user access rights are visually modeled using a graph model. The graph model example is further described below. Specifically, graph models may be generated and executed by the access review engine 112. The graph models may allow for a highly-efficient execution of UA reviews over MCAs and of SoD reviews over MCAs. Further, the graph models may provide highly-efficient execution of cross-app SoD reviews over multiple MCAs simultaneously. Specifically, cross-application SoD over multiple MCAs at the same time may use multiple graph models concurrently. The system can extend to support new MCAs by designing new graph models representing the permissions model of each MCA.

FIG. 2 illustrates an application programming interface (API) that connects to the Engines component. Specifically, the API connects to the sub-components MainAuthEngine and CrossAppEngine in order to expose the main functionality via API. This main functionality includes but is not limited to auth_check, sod_check, cross-app_check, and others.

The auth_check represents a UA review over one specific MCA. As user-input, it receives the type of MCA being assessed (e.g.: SALESFORCE), a defined list of permissions (e.g.: access to setup menu, access to create users), an operator for the list of permissions (e.g.: AND/OR), the list of users to be analyzed (e.g.: all, service users, guest users, etc), among others. As a result, it will generate a list of "paths" where each path represents how each permission is assigned to a certain user (e.g. who has which permissions?). In other scenarios, instead of a list of permissions, the user-input would receive a node type (e.g. Role node type) and a list of node names (in this example, role names).

sod_check represents an SoD review over one specific MCA. As user-input, it receives the type of MCA being assessed, the list of users to be analyzed (e.g.: all, services users, guest users, etc), two lists of permissions with their operators as defined by auth_check (e.g.: list 1=access to setup menu, access to create users, operator 1=AND, list 2=access to create profiles, access to create roles, operator 2=OR), among others. As a result, it will generate a list of "paths" where each path represents how each specific permission is assigned to a certain user (e.g. who has the permission). As compared with auth_check, sod_check may have a result that will include more "paths" as each identified user may have multiple permissions assigned at the same time, this may include the situation where one permission is assigned through multiple ways (e.g. three roles having the same permission and the user is assigned to all three roles).

Cross-app_check represents an SoD review over two specific MCAs. As user-input, it receives the same type of input as sod_check, but each list of permissions has one type of MCA associated with (e.g.: list 1=access to create employee, operator 1=AND, MCA 1=SuccessFactors, list 2=access to pay to employees, operator 2=AND, MCA 2=ADP), among others. As a result, in some embodiments, it will generate a similar result than sod_check.

Figure 3:
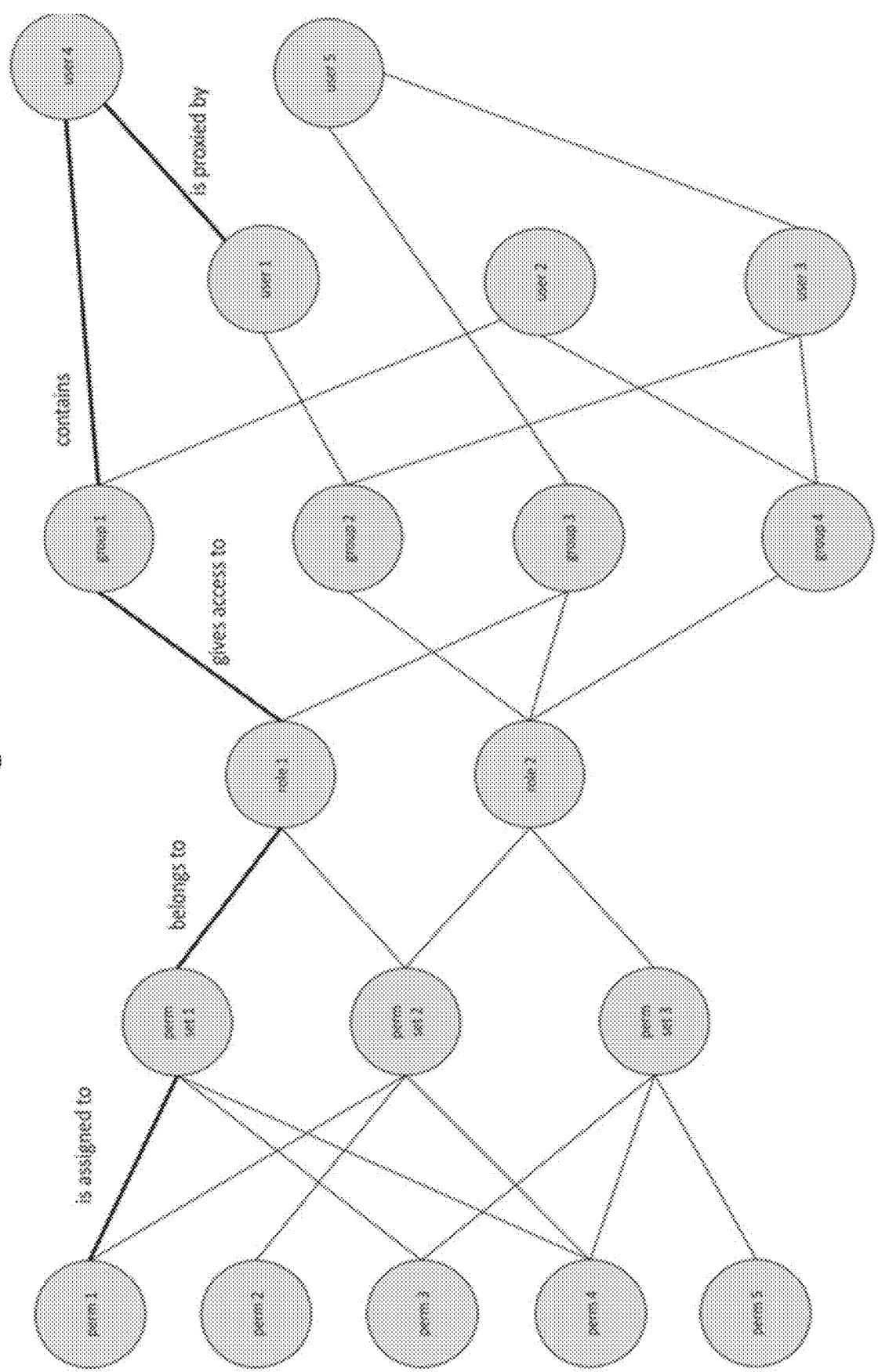
FIG. 3 illustrates a visual indication of permissions.

The GraphModels include one or multiple <App>Models. There may be one specific GraphModel sub-component that defines the permissions model for each type of supported MCA (e.g.: SalesforceModel, WorkdayModel, SAPModel, NetsuiteModel, OracleModel, etc). Each model defines a set of nodes and edges that defines the permissions model for that particular MCA into a Graph or similar representation. FIG. 3 is one example MCA graph. MCAs can implement their own authorizations model, such as RBAC (Role-Based-Access-Control). The authorizations model can be established as a graph where the nodes represent specific MCA concepts, such as user, role, profile, permission, group, etc. The graph edges may represent the relationships of those nodes/concepts. For example, the edge may be "a role is assigned to a user", "a role includes a permission", "a user belongs to a group", etc.

The Engines include an <App>Engine, a MainAuthEngine, and a CrossAppEngine. The <App>Engine may be a specific Engine sub-component for each type of supported MCA (e.g.: SalesforceEngine, WorkdayEngine, SAPEngine, NetsuiteEngine, OracleEngine, etc). Each <AppEngine> defines a method (e.g.: users_by_permission) that describes how to traverse the graph because the traversal may be different for each MCA and then each graph. This method uses the <App>Model definition of nodes and edges to go through the graph and find the correct paths. From a graph theory perspective, a path is a sequence of edges that joins a sequence of nodes. In this context, one example of a path could be: 1) Node: permission="create users"; 2) Edge: "is in"; 3) Node: role="user management"; 4) Edge: "is assigned to"; 5) Node: group="managers"; 6) Edge: "contains"; and 7) Node: user="john_smith"

Each path represents one row of the end result that contains a collection of paths. Obtaining the full path (from end-to-end) may be important from a user perspective because it allows security administrators (consuming this output) to take proper action to ensure security. For example, if the end result is just a list of users with access to certain permission, security administrators would not be able to remediate those users if they don't know how those permissions were assigned. By providing the full path, security administrators know how permissions are assigned and can take proper action.

MainAuthEngine: The main authority engine is a component that executes the auth_check and sod_check API requests by processing the results of the users_by_permission method from different <App>Engine. For example, if an auth_check method execution for Salesforce requires checking for users with access to the Setup Menu and access to assign permissions, those are two different permissions. <App>Engine will execute users_by_permission twice, one for each permission, and the auth_check method will be in charge of making sure the same users belong to both sets of results (if the operator was AND). Similarly, the sod_check can receive two or more different groups of permissions, which can be seen as two or more auth_check executions and then running an intersection on both results.

CrossAppEngine implements the cross-app_check which may be similar to sod_check. One difference is that the two groups of permissions are associated with different applications. Therefore, it may run two or more different auth_checks where each auth_check belongs to a different <App>Engine.

There can be a permissions database and a graph database. The permissions database includes all the raw data about the permissions in the MCA. This database could be the MCA database itself or it could be a separate database that includes an extraction of the MCA permissions database. It may also include information to ease the queries or enrich the results, e.g.: usernames, user types and user status may not be used to build the graph of permissions but they may be used to create the results. The graph database stores the graph of the MCA permissions. In some embodiments, there can be one graph database for each MCA or there can be a single graph database for all MCAs. The graph database can be a dedicated graph database (e.g.: Neo4j, Dgraph, Amazon Neptune, etc.) or it could be implemented as a traditional relational database (e.g.: Oracle, SQLite, PostgreSQL, Informix, MySQL, etc.).

The GraphHandler is in charge of analyzing the different GraphModels, creating the actual graphs and storing them in the Graph Database. In addition, GraphHandler may be the main interface between the Engines and the Graph Database. When the different <App>Engines are working, they run different queries in the Graph Database ultimately to get a path (as explained above). The GraphHandler makes it transparent for the Engines to receive paths without having to pre-process the results.

In some embodiments, the GraphHandler is in charge of creating the graph based on an <App>Model. The <App>Model defines how each node and edge is retrieved from the Permissions Database (e.g. through the SourceDataHandler). For example, an <App>Model may define that the node type "user" maps to the table "USERS", field "ID" from the Permissions Database. Using the SourceDataHandler, the GraphHandler will retrieve all the different values for the column ID within the table USERS and each value will be used to create a different node of type "user".

In another example: an <App>Model may also define the edge type "belongs to" that associates users with groups (e.g.: userA belongs to group1). The <App>Model has the definition of this edge type mapping it to the table "GROUP_MEMBERS", fields "USERID" and "GROUPID" from the Permissions Database. Using the SourceDataHandler, the GraphHandler will retrieve all the different values for the columns USERID and GROUPID within the table GROUP_MEMBERS and each pair of values can be used to create an edge between two different nodes, and in one example, the edge will be used to connect a user node with a group node.

When analyzing the graph to produce results (paths), the GraphHandler can also use the <App>Model graph definition to understand how it has to be analyzed. For example: an MCA may define that a permission is in a role, a role is assigned to a group, and the group contains users. The <App>Model defines valid paths within the graph. In this example, the path would be the set of edges "IS IN", "IS ASSIGNED TO", "CONTAINS", and each edge associates two different nodes. "IS IN" connects a permission node with a role node (permission is in role). "IS ASSIGNED TO" connects a role node to a group node (role is assigned to group). "CONTAINS" connects a group to one or multiple users (group contains user). When a UA review is requested, the GraphHandler will find all the valid paths (defined in <App>Model) where the initial node is the permission requested by the UA. In one embodiment, an example of this is shown in FIG. 3.

The GraphHandler also allows for the review (either UA or SoD) to request as an initial node, not only permissions, but any node that the <App>Model graph contains. The GraphHandler will start walking the graph and finding the paths from that node. This allows executing query reviews on any concept of the MCA permission schema. For example, a UA review could request for Users with certain Roles. In this scenario, the initial node would be a Role node instead of a Permission node.

The GraphDBLayer is an optional layer depending on what type of database is used to store the graph. If using a dedicated graph database, this layer may not be necessary. If using a traditional relational database to store a graph, then this layer may be necessary to make the translation between graph queries and traditional SQL queries.

The SourceDataHandler is the main interface between the Engines and the Permissions Database. It may be used to build the graph, to ease queries, and to enrich the results with additional required information for the user.

FIG. 3 illustrates a visual indication of permissions for an example MCA. This illustrates the nodes and edges of the graph for the MCA. FIG. 3 illustrates which nodes "are assigned to" other nodes, and which nodes "belong to" other nodes, and which nodes "give access to" other nodes, and which nodes "contain" other nodes or "are proxied by" other nodes. The edges represent different types of connections between the nodes. This is just one example but graph models could have different nodes, edges, and meanings, while still representing how users can access certain functionalities in the MCA.

The example nodes include:
perm <x> is the permission or authorization that represents an action in the system (e.g. create employee, pay to vendor, change configuration, etc.).
perm set <x> is a grouping of permissions (e.g. all the permissions required to manage users, all the permissions required to manage salary information, etc.).
role <x> is a grouping of permission sets. In general, roles may be associated with job positions (e.g. HR manager role, CFO role, accountant role, etc.).
group<x> is a group of users used to easily manage their permissions assignments (e.g. accountants, HR team, etc.).
user <x> is the end user able to execute a certain action, which is usually represented by a combination of first and last name or random numbers.

The example Edges include:
"is assigned to" represents the relationship between permissions and permission sets. A permission is assigned to a permission set.
"belongs to" represents the relationship between permission sets and roles. A permission set belongs to a role.
"gives access to" represents the relationship between roles and groups. A role gives access to a group.
"contains" represents the relationship between groups and users. A group contains a user.
"is proxied by" represents the relationship between users and other users. A user is proxied by another user. This is a relationship where users are able to operate in the MCA as if they were another user.

The combination of nodes and edges represent the permissions model of the MCA. In most implementations, the graph is a directed graph read from left to right, but there may be other embodiments with different organization.

In one example, when a UA review is requested, the questions to be asked are "Which users have the permission "perm 1"? and how do they have the permission?" Based on this model, the <App>Engine will use the GraphHandler to walk through the graph finding all valid paths between perm 1 and a user node. First, it may try to find all the "is assigned" edges that start from "perm 1." The embodiment in FIG. 3 shows that there are two edges coming out of "perm 1" that connect to "perm set 1" and "perm set 2". The GraphHandler generates two paths: ["perm 1", "perm set 1"] and ["perm 1", "perm set 2"]

Having those two paths, the <App>Engine continues traversing through the graph to find the next nodes in the path by finding the nodes that are connected through the edge "belong to". In the embodiment of FIG. 3, there is one edge coming out of "perm set 1" and two edges coming out of "perm set 2". Accordingly, the <App>Engine will generate three paths: ["perm 1", "perm set 1", "role 1"], ["perm 1", "perm set 2", "role 1"], ["perm 1", "perm set 2", "role 2"] in this embodiment.

Having those three paths, the <App>Engine continues traversing through the graph to find the next nodes in the path by finding the nodes that are connected through the edge "gives access to". Following the edges, new paths are generated: ["perm 1", "perm set 1", "role 1", "group 1"], ["perm 1", "perm set 1", "role 1", "group 3"], ["perm 1", "perm set 2", "role 1", "group 1"], ["perm 1", "perm set 2", "role 1", "group 3"], ["perm 1", "perm set 2", "role 2", "group 2"], ["perm 1", "perm set 2", "role 2", "group 3"], ["perm 1", "perm set 2", "role 2", "group 4"].

Having all those paths generated, the <App>Engine continues until reaching the end of the graph (meaning a user node). New paths are generated as a result of the next iteration: ["perm 1", "perm set 1", "role 1", "group 1", "user 4"], ["perm 1", "perm set 1", "role 1", "group 1", "user 2"], ["perm 1", "perm set 1", "role 1", "group 3", "user 5"], ["perm 1", "perm set 2", "role 1", "group 1", "user 4"], ["perm 1", "perm set 2", "role 1", "group 1", "user 2"], ["perm 1", "perm set 2", "role 1", "group 3", "user 5"], ["perm 1", "perm set 2", "role 2", "group 2", "user 1"], ["perm 1", "perm set 2", "role 2", "group 2", "user 3"], ["perm 1", "perm set 2", "role 2", "group 3", "user 5"], ["perm 1", "perm set 2", "role 2", "group 4", "user 2"], ["perm 1", "perm set 2", "role 2", "group 4", "user 3"].

This last list of paths may be the final result from the analysis of the graph. If it picks just one (the last one), it means that user 3 has perm 1 through perm set 2 that maps to role 2 which gives permission access to group 4, which is the group that includes user 3. If a security administrator wants to fix this assignment (e.g. remove it), the security administrator can do it at different levels, such as removing the user from the group, removing the group from the role, removing the permission set from the role, or removing the permission from the permission set. Accordingly, the assignment of permissions are displayed visually for the security administrator.

Figure 4:
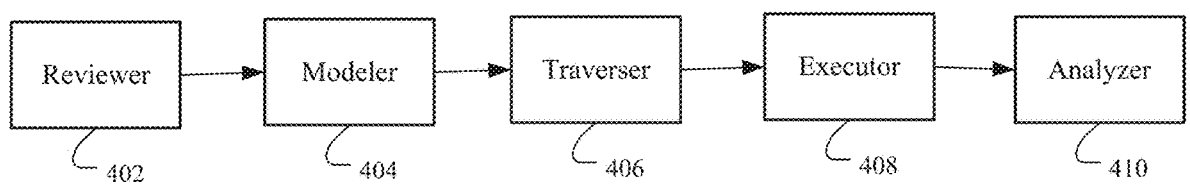
FIG. 4 illustrates an example flow for the network system of FIG. 1.

FIG. 4 illustrates an example flow for the network system of FIG. 1. The reviewer 402 may also be referred to as a review module and may include the auth_check for UA review over one or more MCA. It may receive the permissions and users to be reviewed. In other embodiments, the review module 402 may include the sod_check, or it may be part of a different module for segregation of duties review of a single MCA. In other embodiments, the review module 402 may include the Cross-app_check, or it may be part of a different module for segregation of duties review of multiple MCAs. A modeler 404 generates a permissions model for each MCA for the GraphModel discussed above. Each model defines a set of nodes and edges that defines the permissions model for an individual MCA into a graphical representation. The nodes represent the specific MCA concepts (e.g.: user, role, profile, permission, group, etc.) and the edges represent their relationships (e.g.: role is assigned to user, role contains permission, user belongs to group, etc.). The output of the modeler 404 may be a plurality of graphical representations (i.e. graph models or permissions models) that each correspond with a different MCA. The traverser 406 traverses the generated graphical representation. This may also be referred to as walking the graph. The traverser 406 may be performed by <App>Engine discussed above. The executor 408 (e.g. MainAuthEngine) processes the results from the graphical representation to establish permissions. The executor 408 may also include the CrossAppEngine, or it may be part of a different module. In some embodiments, the executor 408 may be a part of the traverser 406 and the traversing of the model may be part of the execution. This may include a cross check for two groups of permissions associated with different applications. The analyzer 410 analyzes different GraphModels (e.g. GraphHandler) and creates the actual graphs, which can then be stored in a database. The analyzer 410 may be or may include the main interface between the Engines and the Graph Database.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

The meaning of specific details should be construed as examples within the embodiments and are not exhaustive or limiting the invention to the precise forms disclosed within the examples. One skilled in the relevant art will recognize that the invention can also be practiced without one or more of the specific details or with other methods, implementations, modules, entities, datasets, etc. In other instances, well-known structures, computer-related functions or operations are not shown or described in detail, as they will be understood by those skilled in the art.

The discussion above is intended to provide a brief, general description of a suitable computing environment (which might be of different kinds like a client-server architecture or an Internet/browser network) in which the invention may be implemented. The invention will be described in the general context of computer-executable instructions, such as software modules, which might be executed in combination with hardware modules, being executed by different computers in the network environment. Generally, program modules or software modules include routines, programs, objects, classes, instances, components, data structures, etc., that perform particular tasks or implement particular abstract data types. Computer-executable instructions, associated data structures and program modules represent examples of the program code means for executing the steps of the method described herein. The particular sequence of such executable instructions, method steps or associated data structures only represent examples of corresponding activities for implementing the functions described therein. It is also possible to execute the method iteratively.

Those skilled in the art will appreciate that the invention may be practiced in a network computing environment with many types of computer system configurations, including personal computers (PC), hand-held devices (for example, smartphones), multi-processor systems, microprocessor-based programmable consumer electronics, network PCs, minicomputers, mainframe computers, laptops and the like. Further, the invention may be practiced in distributed computing environments where computer-related tasks are performed by local or remote processing devices that are linked (either by hardwired links, wireless links or by a combination of hardwired or wireless links) through a communications network. In a distributed computing environment, program modules may be located in local or remote devices, memory systems, retrievals or data storages.

Generally, the method according to the invention may be executed on one single computer or on several computers that are linked over a network. The computers may be general purpose computing devices in the form of a conventional computer, including a processing unit, a system memory, and a system bus that couples various system components including system memory to the processing unit. The system bus may be any one of several types of bus structures including a memory bus or a memory controller, a peripheral bus and a local bus using any of a variety of bus architectures, possibly such which will be used in clinical/medical system environments. The system memory includes read-only memory (ROM) and random access memory (RAM). A basic input/output system (BIOS), containing the basic routines that have the functionality to transfer information between elements within the computer, such as during start-up, may be stored in one memory. Additionally, the computer may also include hard disc drives and other interfaces for user interaction. The drives and their associated computer-readable media provide non-volatile or volatile storage of computer executable instructions, data structures, program modules and related data items. A user interface may be a keyboard, a pointing device or other input devices (not shown in the figures), such as a microphone, a joystick, a mouse. Additionally, interfaces to other systems might be used. These and other input devices are often connected to the processing unit through a serial port interface coupled to the system bus. Other interfaces include a universal serial bus (USB). Moreover, a monitor or another display device is also connected to the computers of the system via an interface, such as a video adapter. In addition to the monitor, the computers typically include other peripheral output or input devices (not shown), such as speakers and printers or interfaces for data exchange. Local and remote computers are coupled to each other by logical and physical connections, which may include a server, a router, a network interface, a peer device or other common network nodes. The connections might be local area network connections (LAN) and wide area network connections (WAN) which could be used within the intranet or internet. Additionally, a networking environment typically includes a modem, a wireless link or any other means for establishing communications over the network.

Moreover, the network typically comprises means for data retrieval, particularly for accessing data storage means like repositories, etc. Network data exchange may be coupled by means of the use of proxies and other servers.

The example embodiments are to be considered in all respects only as illustrative and not restrictive. The scope of The invention is, therefore, indicated by the appended claims rather than by this description. All changes which come within the meaning and range of equivalency of the claims are to be embraced within their scope.

The invention claimed is:

1. A computer-implemented method for reviewing user access rights comprising:
generating, with a processor, a model, the model including nodes for business application concepts and edges for relationships between the nodes;
providing, with the processor, a graphical representation of the model including the nodes and the edges; and
reviewing, with the processor, the user access rights based on the graphical representation;
wherein:
the user access rights comprise a segregation of duties;
the reviewing further comprises reviewing, with the processor, the segregation of duties based on the graphical representation, where reviewing the segregation of duties comprises a separate review for each of multiple groups of permissions to further identify conflicts; and
reviewing the segregation of duties comprises:
determining, with the processor, which users have access; and
determining, with the processor, how access is assigned.

2. The computer-implemented method of claim 1, wherein:
the graphical representation comprises a graph model;
the graph model comprises a directed graph showing the nodes and the edges;
the nodes in the graph model represent a feature including at least one of a user, role, profile, permission, or group; and
the edges in the graph model represent relationships between the nodes, including at least one of a role assigned to a user, a role with a permission, or whether a user belongs to a group.

3. The computer-implemented method of claim 1, wherein the reviewing the segregation of duties is automatic based on the graphical representation.

4. The computer-implemented method of claim 1, wherein the business application concepts comprises at least one mission critical application.

5. The computer-implemented method of claim 4, wherein the mission critical application further comprises at least one of Enterprise Resource Planning (ERP), Customer Relationship Management (CRM), Supplier Relationship Management (SRM), Supply Chain Management (SCM), Product Life-cycle Management (PLM), or Human Capital Management (HCM).

6. The computer-implemented method of claim 4, wherein the providing comprises a plurality of graphical representations, wherein each of the plurality of graphical representations applies to a different one of the at least one mission critical application.

7. A computer system for reviewing user access rights, comprising:
one or more processors configured to:
generate a model with nodes for business application concepts and edges for relationships between the nodes;
generate a graphical representation of the model including the nodes and the edges for reviewing the user access rights; and
review the user access rights based on the graphical representation;
wherein:
the user access rights comprise a segregation of duties;
to review the user access rights, the one or more processors is configured to review the segregation of duties based on the graphical representation, where reviewing the segregation of duties comprises a separate review for each of multiple groups of permissions to further identify conflicts; and
to review the segregation of duties, the one or more processors is configured to:
determine which users have access; and
determine how access is assigned.

* * * * *